C. MILLER & M. S. DAVIS.
NUT-LOCK.

No. 175,133. Patented March 21, 1876.

Witnesses
J. E. Boggs.
Claudius L. Parker

Inventors:
Chambers Miller,
M. Swift Davis,
by George H. Christy,
their Atty.

N. PETERS, PHOTO-LITHOGRAPHER, WASHINGTON, D. C.

UNITED STATES PATENT OFFICE.

CHAMBERS MILLER AND M. SWIFT DAVIS, OF KILBUCK TOWNSHIP, ALLEGHENY COUNTY, PENNSYLVANIA.

IMPROVEMENT IN NUT-LOCKS.

Specification forming part of Letters Patent No. 175,133, dated March 21, 1876; application filed January 6, 1876.

*To all whom it may concern:*

Be it known that we, CHAMBERS MILLER and M. SWIFT DAVIS, of Kilbuck township, county of Allegheny, State of Pennsylvania, have invented or discovered a new and useful Improvement in Nut-Lock and Washer; and we do hereby declare the following to be a full, clear, concise, and exact description thereof, reference being had to the accompanying drawing, making a part of this specification, in which, like letters indicating like parts—

Figure 1:
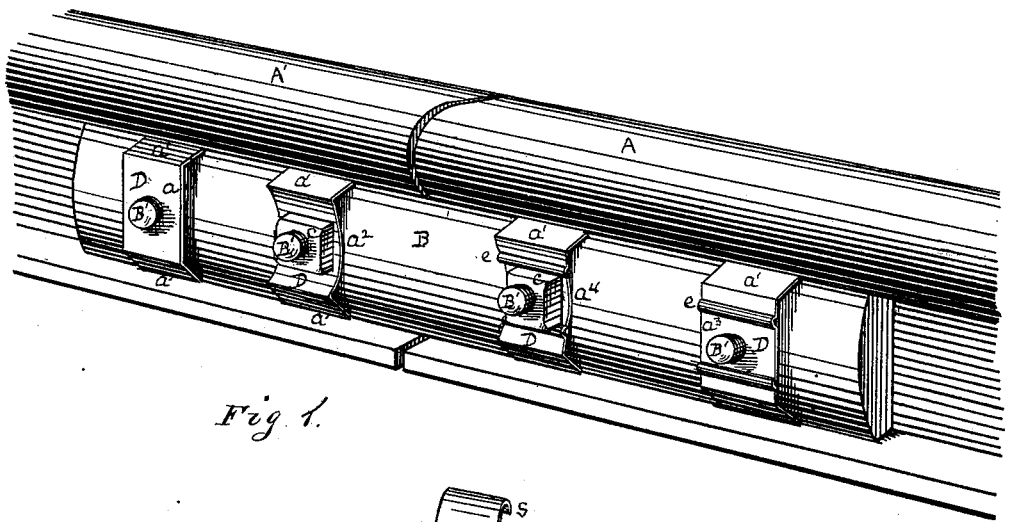

Figure 1 shows, in perspective, our improvement as applied to contiguous ends of two adjacent rails, and illustrating the mode of applying the washer, and also of effecting the locking of the nut; and Figs. 2 to 6 show our improved washer in different and somewhat modified forms.

Our improvement relates to the securing of nuts in place by means of an elastic steel spring-washer having angularly-flanged or bent ends and an intermediate elastic spring-body, to be bent to a concave form by the screwing down of the nut, substantially as hereinafter described; and it also relates to an elastic spring-plate washer, made with transverse corrugations in suitable position to engage the edges of the nut when screwed down to place.

The rails A A' are of the usual or any known construction, as also the fish-bars B, and the usual bolts are represented at B'. The washers D are made of cast-steel, by rolling the same in sheet form, cutting, bending, punching, and tempering in any of the ways known to the art. This washer, in its simplest form, is represented at $a$, in which the body is made plain, and the ends $a^1$ are bent down, as represented, so as to bear against the joint formed by the fish-bar and tread of the rail. After being thus attached, a nut, $c$, is screwed on by means of a wrench, so as to bend down the body of the washer, immediately around the bolt, to a concave form, as represented at $a^2$. The washer thus bent down by its elastic force bears on the under face of the nut with such force as to prevent the tendency of the nut to unscrew or come off. The heads of the bolts are also prevented from rotating by means of a square shank or T-head setting in a groove in the fish-bar, or in other known way.

We have represented at $a^3$ the same washer, made with the addition of a bead, $e$, made in its body part by means of suitable dies or swages, such beads being at suitable distances from the eye of the washer, so that when the nut is screwed down, as at $a^4$, the beads $e$ will have a bearing against the edges of the nut, so as to add a further and additional resistance to the tendency of the nut to unscrew.

These forms of washers are fully represented in Figs. 2 to 5.

Figure 6:
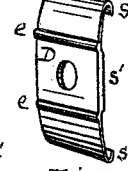
Figures 2, 3, 4, 5:
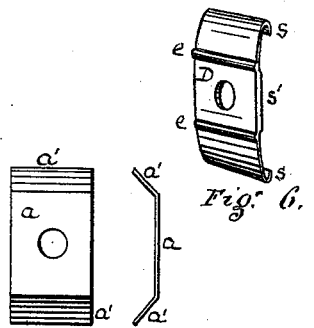

In some cases, when a fish-bar is used flat on its outer face, or when, for other reasons, a good bearing for the ends of the washer cannot be obtained, we prefer to make the washer in the form represented in Fig. 6, in which the ends $s$ are curved downward directly on the outer face of the fish-bar, and leaving the body of the washer clear of the bar until it is pressed down by the screwing on of the nut, as represented in Fig. 1. In this case, however, the length of the washer should be such that one end or the other will bear against either the tread or base of the rail, or be so near thereto as to prevent its turning.

As an additional modification, the washers may be made with a rib, $s'$, along the center of the body and around the eye, as represented in Fig. 6, so that when the nuts are turned on, the bend in the washer will be at or near the edges of the nut.

In this manner we produce a cheap and effective lock-nut, which can be applied and used without the necessary exercise of a great amount of mechanical skill.

By the use of a wrench the nuts can be removed when necessary, and the washers taken off and replaced without injury or destruction.

We claim as our invention—

1. The steel spring-washer $a$, having the bent ends $a^1$, substantially as and for the uses set forth.

2. The washer described, made with one or more transverse beads or corrugations, $e$, in suitable position to engage the edge of the nut when the latter is screwed down, substantially as set forth.

3. The combination of steel spring-washer D and bolt B', nut $c$, fish-bar B, railway-rails A A', substantially as set forth.

In testimony whereof we have hereunto set our hands.

CHAMBERS MILLER.
M. SWIFT DAVIS.

Witnesses:
    GEORGE C. BURGWIN,
    GEORGE H. CHRISTY.